J. COSAND.
Corn Planter.
No. 107,457.
Patented Sept. 20, 1870.
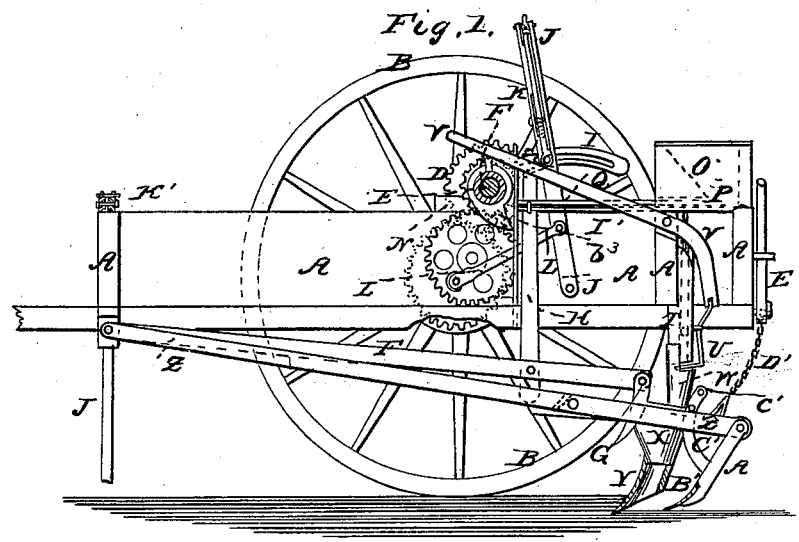
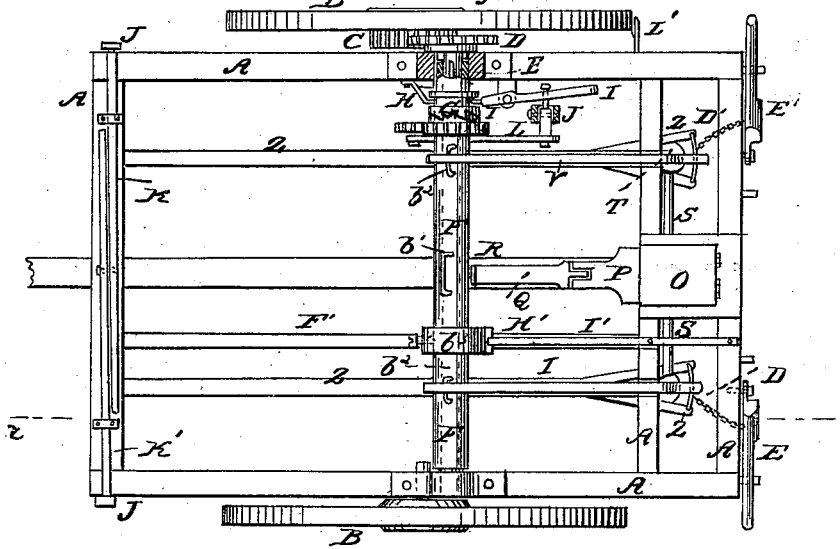
Witnesses:
C. Raettig
David Krisell
Inventor:
J. Cosand
per Munn & Co
Attorneys

UNITED STATES PATENT OFFICE.

JOSEPH COSAND, OF RUSSIAVILLE, INDIANA.

IMPROVEMENT IN CORN-PLANTERS.

Specification forming part of Letters Patent No. 107,457, dated September 20, 1870.

*To all whom it may concern:*

Be it known that I, JOSEPH COSAND, of Russiaville, in the county of Howard and State of Indiana, have invented a new and Improved Corn-Planter; and I do hereby declare that the following is a full, clear, and exact description of the same, reference being had to the accompanying drawing, forming a part of this specification.

My invention relates to corn-planters; and consists in certain improvements, which will be first described in connection with all that is necessary to a full understanding thereof, and then clearly specified in the summary or claims.

Figure 1 is a longitudinal vertical section, and Fig. 2 a plan view, of a machine containing my improvements.

A is the horizontal and main supporting-frame; B, the wheels, and C a spur-wheel on one of them; D, another spur-wheel, fast to a short shaft, E. F is an independent shaft, having projections or loops $b\ b'\ b''$ thereon, and a cam, $b^3$. G is a clutch-sleeve keyed to and sliding upon shaft E, and shifted by spring H and curved slotted lever I. J is a lever attached to I by a bolt. K is a small lever pivoted to J. L is a pitman pivoted to J at one end, and to a crank-pin of spur-wheel M at the other. N is a spur-pinion fast on the end of shaft F, and having a crab on the boss thereof. O is the hopper, and P the dropping-slide, having two apertures, to measure enough seed for a single hill. Q (see Fig. 2) is a bar attached to slide P, and resting against a slotted spring, R. S are seed-receiving inclined spouts attached to standards T, and registering with the slide. U are movable plates covering lower end of standards T, to prevent any escape of seed, while V are levers to operate them. W are guide-tubes between standards T and x. y is a furrowing-plow; and Z, bi-branched beams, to which the covering-plows are attached. A' are plow-standards; B', plows; and C', curved perforated arms to regulate the inclination of plows. D' are chains; and E', cam-levers, adjustably fastened by means of stop-pins, to raise and lower the covering-plows. F' is a pivoted beam of marking-plow G', somewhat elastic to yield to obstructions, and attached to a bar, H', and spring I', which, together, raise it from the ground. J' are vertical bars in front; and K'', slotted horizontal bars, which are attached together, as seen in drawing. L' are pins to scrape the wheels.

The mode of operation is as follows: When the machine is ready, it is driven up in a line with the first pair of hills to be dropped, the clutch not yet connecting the driving-shaft with the power. The bar J is then turned in the curved slot to rotate shaft F, and to cause the projection $b$ thereon and spring B to move forward and back the slide P. This drops the first two hills, and marks the point of starting. Afterward the seed must drop at the regular intervals determined on. The drive-wheel B operates the shaft F through the spur-wheels C D and sliding clutch-sleeve G on the short shaft E.

The revolution of shaft F causes, first, the central loop, $b$, to move forward the spring R and seed-slide P. After the loop passes, the spring R retracts the slide P, which has received its measure of corn for two hills, and now drops it into spout S. The seed is caught by plates U. As the shaft continues to turn, loops $b^2$ and $b^3$ raise levers V, throw back plates U, and allow the corn to fall through guide-tubes W, when it is covered by plows B'.

In order to align the rows and check the hills with exactitude, the device G' is moved down at every revolution of shaft F and at each dropping of seed, to mark the point at which the hills are located and where the cross-rows meet. When the driver turns to go back, he drops his first two hills, as before described, at starting, and at the same time extends one of the vertical rods J' until it points downward to the guiding-line made by the marker G'. By constantly observing the relation of the guide-line and rod J', the driver runs his next two rows exactly parallel to the first, while the marker at the same time provides a guide-line for the succeeding pair of rows.

It will be observed that the marker does not make a continuous line, which would be a sufficient indication by which to run parallel rows, but only dots points which lie in the transverse rows. By the transverse line thus formed the operator can readily see whether he is departing from the proper direction of his cross-rows, and, if so, can stop at any part of the field and align transversely.

Having thus clearly described all that is necessary for a full understanding of my invention, what I esteem to be new, and desire to protect by Letters Patent, is—

1. The combination, with an independent driving-shaft, F, of a fast pinion, N, spur-wheel M, pitman L, and pivoted lever J, to revolve the said shaft to the proper position for actuating the mechanism to drop the first pair of hills.

2. The arrangement, with respect to the movable lever J, of the small lever K and the arc-slotted laterally-movable lever I, so that the driver can simultaneously hold the clutch-sleeve G out of connection with shaft F, and revolve said shaft to the point required.

3. The marker G', arranged to dot points in a straight line, parallel to the rows being planted, and in line with the cross-rows, as and for the purpose specified.

4. The arrangement, with respect to a central hopper, of two inclined spouts, S, movable catch-plates U, and guide-tubes W, for the purpose of dropping in checks two rows of corn at the same time.

5. The arrangement, in a corn-planter, with respect to clutch-sleeve G and shaft F, of the short shaft E, lever I, and spring H, to connect and disconnect the power at the times specified.

JOSEPH COSAND.

Witnesses:
   BENJAMIN KING,
   BENJAMIN DELON.